United States Patent [19]

Gerber

[11] 4,285,996
[45] Aug. 25, 1981

[54] POLYOXYALKYL AMINE-POLYISOCYARATE REACTION PRODUCTS AS COAGULATION AGENTS FOR BINDING AGENT DISPERSIONS

[75] Inventor: Hans Gerber, Strengigässli, Switzerland

[73] Assignee: Sandoz Ltd., Basel, Switzerland

[21] Appl. No.: 46,478

[22] Filed: Jun. 7, 1979

Related U.S. Application Data

[63] Continuation-in-part of Ser. No. 940,069, Sep. 5, 1978, abandoned.

[30] Foreign Application Priority Data

Sep. 6, 1977 [CH] Switzerland .................. 10851/77

[51] Int. Cl.$^3$ .................. C08G 71/04; C08L 75/08
[52] U.S. Cl. .................. 427/389.9; 260/3; 260/29.2 TN; 260/29.4 R; 260/29.6 NR; 427/389; 427/392; 428/445; 528/78
[58] Field of Search .................. 260/29.2 TN, 3; 427/390 R; 428/445; 528/78; 252/316

[56] References Cited

U.S. PATENT DOCUMENTS

| | | | |
|---|---|---|---|
| 3,832,323 | 8/1974 | Ramey et al. | 528/78 |
| 3,876,725 | 4/1975 | Wells et al. | 528/85 |
| 3,998,871 | 12/1976 | Carlson | 260/29.2 TN |
| 4,028,313 | 6/1977 | Müller et al. | 260/29.2 TN |
| 4,039,517 | 8/1977 | Hamamura et al. | 260/29.2 TN |
| 4,068,035 | 1/1978 | Violland et al. | 260/29.2 TN |
| 4,092,286 | 5/1978 | Noll et al. | 260/29.2 TN |

FOREIGN PATENT DOCUMENTS

| | | |
|---|---|---|
| 788121 | 8/1972 | Belgium . |
| 2280644 | 2/1976 | France . |
| 1045175 | 10/1966 | United Kingdom . |
| 1071457 | 6/1967 | United Kingdom . |
| 1310754 | 3/1973 | United Kingdom . |
| 1469813 | 4/1977 | United Kingdom . |

*Primary Examiner*—Theodore E. Pertilla
*Attorney, Agent, or Firm*—Gerald D. Sharkin; Richard E. Vila; Thomas C. Doyle

[57] ABSTRACT

The present invention relates to a process for producing a non-woven fabric comprising impregnating a non-woven fibrous web with an aqueous binding agent dispersion containing, as coagulation agent, a polyurethane having a weight average molecular weight of from 500 to 20,000 which is the reaction product of (i) a polyoxyalkylated aliphatic amine containing d nitrogen atoms, where d is 1 to 5, and where d is greater than 1, each nitrogen atom is connected with the next by a ($C_{2-4}$) alkylene moiety and from $d+1$ to $d+2$ polyoxy($C_{2-4}$)alkylene units, with the proviso that the molecule contains $C_2$ alkyleneoxy units and $C_3$ and/or $C_4$ alkyleneoxy units with the $C_3$ and/or $C_4$ units forming the majority of alkyleneoxy units, and (ii) from 0.1 mols to 2 mols per mol of (i) but not exceeding the stoichiometric amount of a polyisocyanate, which product is optionally in quaternized form and, is present in an amount of from 0.5 to 50 parts per weight per 100 parts of binder solids, followed by drying the web.

43 Claims, No Drawings

POLYOXYALKYL AMINE-POLYISOCYARATE REACTION PRODUCTS AS COAGULATION AGENTS FOR BINDING AGENT DISPERSIONS

This application is a continuation-in-part of copending application Ser. No. 940,069, filed Sept. 5, 1978 and now abandoned.

The present invention relates to a process for producing non-woven fabrics by impregnating a non-woven fibrous web with a binding agent dispersion and dispersions for effecting the same.

More particularly, the present invention provides a process for producing a non-woven fabric which comprises impregnating a non-woven fibrous web with an aqueous binding agent dispersion containing, as coagulation agent, a polyurethane having a weight average molecular weight from 500 to 20,000 which is the reaction product of (i) a polyoxyalkylated aliphatic amine containing d nitrogen atoms, where d is 1 to 5, and where d is greater than 1, each nitrogen atom is connected with the next by a $(C_{2-4})$alkylene moiety and from $d+1$ to $d+2$ polyoxy$(C_{2-4})$alkylene units, with the proviso that the molecule contains $C_2$ oxyalkylene units and $C_3$ and/or $C_4$ oxyalkylene units with the $C_3$ and/or $C_4$ units forming the majority of oxyalkylene units, and (ii) from 0.1 mols to 2 mols per mol of (i) but not exceeding the stoichiometric amount of a polyisocyanate, which product is optionally in quaternized form and, is present in an amount of from 0.5 to 50, preferably from 1 to 50, more preferably, from 2 to 25 parts by weight per 100 parts of binder solids, followed by drying the web.

Preferred amines are those in which each polyoxyalkylene unit solely contains a mixture of two carbon and three carbon-containing oxyalkylenes with a preponderance of the latter.

Also the preferred amines are those in which d is 1 to 4, more preferably 1 to 3, with those wherein d is 1 (ammonia derivatives) being most preferred. Thus, the amine preferably contains at most 3 alkylene groups, more preferably at most 2, with those amines which contain no alkylene group being most preferred. When alkylene groups are present, preferably each alkylene group independently, contains 2 or 3 carbon atoms, more preferably each alkylene group contains 2 carbon atoms.

When the number of polyoxyalkylene units is $d+1$, the other groups bound to the nitrogen atoms are $(C_{1-6})$alkyl groups, preferably $(C_{1-2})$alkyl groups.

Preferred polyisocyanates are di- and triisocyanates, with diisocyanates being preferred. The isocyanate is preferably employed in an amount of from 0.5 mols to the stoichiometric amount.

Preferred polyurethanes are those which are the reaction product of an amine of formula I $$H(OC_2H_4)_a (OC_3H_6)_x (OC_2H_4)_p$$
$$H(OC_2H_4)_b (OC_3H_6)_y (OC_2H_4)_q{-}N$$
$$H(OC_2H_4)_c (OC_3H_6)_z (OC_2H_4)_r$$

I wherein the sum of $x+y+z$ is 9 to 45 and the sum of $a+b+c+P+q+r$ is 6 to 30 whereby

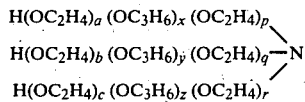

is 0.6 to 0.9 and each of x, y and z is a whole number $\geq 1$ and each of a, b, c, p, q and r is a whole number $\geq 0$, and 0.2 to 1.5 mols of an aliphatic, cycloaliphatic or aromatic diisocyanate, which product is preferably in quarternized form.

In the compounds of formula I, the sum of $x+y+z$ is preferably 12 to 36, more preferably 14 to 20. The sum of $a+b+c+p+q+r$ is preferably 10 to 28. Preferably the sum of $p+q+r$ is greater than the sum of $a+b+c$, the preferred sum of $a+b+c$ being 0 to 3.

The preferred diisocyanates are those containing up to 9 carbon atoms with toluene diisocyanate (especially, the technical mixture of the 2,4- and 2,6-compounds), hexylenediisocyanate and cyclohexylenediisocyanate being most preferred. Most preferably the diisocyanate is employed in an amount of from 0.5 to 1.5 mols per mol of compound of formula I, with 1.4 to 1.5 mols being especially preferred.

The reaction of the polyoxyalkylene amine with the polyisocyanate may be effected by mixing the two components and stirring at temperatures of from 20° to 130° C. If a polyurethane in quaternized form is desired, the reaction product may subsequently be quaternized in accordance with known methods employing standard quaternating agents, or the amine to be reacted with the polyisocyanate may be first quaternized in accordance with known methods.

Preferred quaternating agents are alkylating agents such as dimethylsulphate, diethylsulphate, methylchloride or benzylchloride.

The amines themselves are produced in accordance with known methods, for example by reacting ammonia, ethylenediamine etc. with alkyleneoxides.

The binding agents employed may be any of those aqueous dispersions containing non-ionic and/or anionic dispersing agents commonly used in the production of non-woven fabrics. Examples of binders are natural latex, homo- and copolymers of butadiene, styrene, acrylonitrile, isobutylene, vinylesters such as vinyl acetate and —propionate, vinyl halides, vinylidene chloride, acrylic esters such as methyl and butylacrylate, methylacrylic acid esters, methylene-bis-acrylic amide, N-methyl-1-acrylamide. In addition to the above the binder may contain homo or copolymers of dimethylol urea, dimethylolpropylenurea, dimethylolmelamine and dimethylolmethylcarbamete.

Impregnation of the non-woven fibrous web is carried out in accordance with known methods, for example by treatment in a bath or by padding. The bath or padding liquor may also contain pigments if a dyed fabric is desired.

The nature of the non-woven fibrous web is not critical. Examples of typical non-woven natural and synthetic raw materials for the process of the present invention are cotton, jute, sisal, wool, silk, viscose, polyamide, polyacrylonitrile, polyester and polypropylene and mixtures thereof.

After impregnation, the web is suitably dried in an atmosphere having a temperature of up to 200° C., preferably from 120° to 160° C. The substrate itself reaches a wet bulb temperature of between 40° to 80° C. during the drying process. When a coagulation agent is not present it is at the web bulb temperature that migration of the binder occurs. Therefore, the amount of coagulation agent employed in the process of the present invention is chosen such that the coagulation agent forms a coagulate with the binder before the wet bulb temperature is reached and thus prevents the latter from migrating to the surface of the substrate. Additionally, when a pigment is present, migration thereof is also inhibited by the coagulation agent. Advantageously, the conditions are chosen such that the coagulation occurs at a temperature of approximately 5°–10° C. below the wet bulb temperature.

The temperature at which coagulation occurs depends to a certain extent on the pH value of the impregnation liquor. It has been found that the dependence on the pH value is lessened if the polyurethane is in quaternized form. In general the pH value of the impregnation liquor is from about 3 to 10. In the case of some binders, for example with a butadiene-acrylonitrile binder, a vulcanisation agent of the zinc oxide/sulphur type may also be present in the impregnation liquor, in which case it is advantageous to employ an impregnation liquor having a pH value greater than 6, especially from 8 to 10. Furthermore, it has been found in some cases, that in order to optimise the mechanical stability of the binder dispersion it is advantageous to work in an alkaline medium.

The amount of isocyanate employed and the constitution of the amine may also affect the coagulation temperature.

Thus, the amount of coagulation agent employed will depend on the binder, the constitution of the impregnation liquor, the pH thereof and the coagulation agent. In order to determine the optimum amount of the coagulation agent, the binder to be employed is mixed with the coagulation agent in a beaker, the mixture is slowly heated and the temperature at which coagulation occurs is noted. Coagulation should occur at a temperature above room temperature and desirably not higher than 60° C., more preferably 50° C. However, it will be appreciated that as the wet-bulb temperature (which sets the criteria for the coagulation temperature) itself depends on the humidity of the drying medium, in some cases the coagulation temperature may be above 60° C. The relationship between the wet-bulb temperature and the humidity of the drying medium is explained in the article "The thermomigration of aqueous binder dispersions during the manufacture of non-wovens" by J. Troesch and G. Hoffmann Vol. 58 No. 11, November 1975, *The Journal of the Technical Association of the Pulp and Paper Industry*.

The following test results demonstrate the effects of the particular coagulation agent employed on the coagulation temperature.

(a) 700 g/l of "Perbunan" Latex 3415 M containing 47.5% butadiene-acrylonitrile binder were mixed with 10 g/l of various coagulation agents which are the reaction product of 1 mol

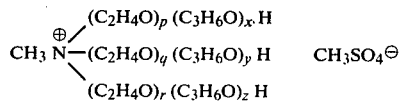

$p+q+r=13$ and $x+y+z=16$ and X mols toluenediisocyanate.

The whole was slowly heated and the coagulation temperature was noted.

| RESULTS | |
|---|---|
| X | Coagulation temperature |
| 0.5 | 71° C. |
| 0.9 | 58° C. |
| 1.2 | 54° C. |
| 1.5 | 41° C. |

(b) Test (a) was repeated but employing as the coagulation agents, reaction products of

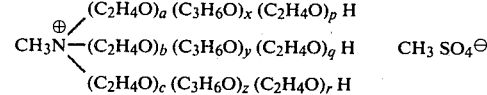

and 1.5 mols toluene diisocyanate.

| RESULTS | | | |
|---|---|---|---|
| a + b + c | x + y + z | p + q + r | coagulation temperature |
| 3 | 24 | 15 | 62° C. |
| 23 | 33 | 3 | 54° C. |
| 3 | 24 | 17 | 51° C. |
| 3 | 16 | 10 | 43° C. |

(c) 640 g/l of "Perbunan" Latex 3415 M (employed in test (a)) were mixed with 50 g/l vulcanisation agent and a g/l of various coagulation agents obtained by reacting 1 mol

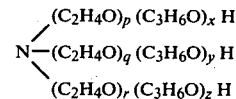

with 0.5 mols toluene diisocyanate and the whole was adjusted to pH 8 with ammonia.

| RESULTS | | | |
|---|---|---|---|
| a | p + q + r | x + y + z | Coagulation temperature |
| 30 | 13 | 16 | 47° C. |
| 30 | 18 | 22 | 44° C. |
| 30 | 28 | 35 | 56° C. |
| *30 | 28 | 35 | 51° C. |
| *5 | 13 | 16 | 50° C. |

*quaternized with dimethylsulphate.

It has also been found that in the process of the present invention it is advantageous to add a small amount of phenol-formaldehyde condensate to the impregnation liquor. Suitably, from about 1 to 3 parts by weight per thousand parts impregnation liquor are employed.

Further, the present invention also provides an aqueous dispersion comprising a binder and from 0.5 to 50 parts by weight per 100 parts binder solids of a polyurethane as described above, optionally in quaternized form. The preferred dispersions are those containing 2 to 25 parts by weight of polyurethane with those dispersions wherein the polyurethane is in quaternized form being most preferred. Those polyurethanes which are the reaction product of (i) an amine of formula I, as defined above and (ii) from 0.2 mols to 1.5 mols of an aliphatic, cycloaliphatic or aromatic diisocyanate also form part of the present invention.

The following Examples further serve to illustrate the invention. In the Examples all parts are by weight and all temperatures are in degrees Centigrade.

EXAMPLE 1

A fibre sheet which has been pre-strengthened mechanically and consists of staple rayon and shrunken polyester fibres, is treated with an impregnation liquor having the following composition:

700 parts of "Perbunan" Latex 3415 M (Bayer), consisting of an aqueous dispersion which contains 47.5% butadiene-acrylic binder
90 parts of a commercial vulcanisation agent
50 parts of a mixture of:
  6 parts of C.I. Pigment Yellow 83
  18 parts of C.I. Pigment Yellow 42
  18 parts of C.I. Pigment Red 101
  18 parts of C.I. Pigment Brown 7
152.5 parts of water
5 parts of the coagulation agent as set forth below, and
2.5 parts of a sulphonated phenol-formaldehyde condensate (commercial product)
1000 parts The coagulation temperature of the thermo-sensitized binder dispersion is 49°. The pH value of the impregnation liquor is 8 and the pick-up is 200% (in relation to the dry weight of the goods).

The impregnated non-woven fabric is passed through an infra-red field and subsequently through a convection drier at 150°. This effects a shock-type coagulation of the binding agent onto the fibres, whereupon thermomigration (wandering) is prevented.

The binding agent is distributed evenly on the non-woven fabric. The binding through the entire cross-section is good. There is no sign of delamination or hardening in the texture.

Composition of the coagulation agent $$1\ mol\ CH_3\overset{\oplus}{-}N \begin{matrix} (C_2H_4O)_p(C_3H_6O)_xH \\ -(C_2H_4O)_q(C_3H_6O)_yH \\ (C_2H_4O)_r(C_3H_6O)_zH \end{matrix}$$

$$CH_3SO_4^{\ominus}$$

$x+y+z=16$, $p+q+r=13$ reacted with 0.5 mols toluylene diisocyanate.

EXAMPLE 2

A hydrodynamically formed viscose fibre sheet is treated with an impregnation liquor having the following composition:

500 parts of an aqueous dispersion which contains 35% of polyacrylate binder ("Primal E" 934, the Registered Trade Mark of the firm Rohm/Haas)
465.5 parts of water
9.5 parts of C.I. Pigment Yellow I, C.I. 11 680, of formula $$H_3C-\underset{}{\bigcirc}\overset{NO_2}{-}N=N-\underset{\underset{O}{\overset{\parallel}{C}}}{\overset{CH_3}{\underset{|}{C}-OH}}-CO-NH-\bigcirc$$

25 parts of the coagulation agent according to Example 1
1000 parts

The coagulation temperature of the thermo-sensitized binder dispersion is 49°. The pH value of the thermo-sensitized impregnation liquor is 4.0 and the pick-up is 100%, in relation to the dry weight of the fibre sheet.

After impregnation, the fibre sheet is dried on one side in an infra-red field. No uni-lateral migration of binding agent and dyestuff towards the surface facing the IR beam, which happens when the thermo-sensitized agent has not been added, can be observed. The fibre sheet obtained has no two-sided coloured effects, i.e. the dyestuff is distributed evenly through the entire cross-section, and there are no uni-lateral changes in the texture and no piling effect.

EXAMPLE 3

A spun fabric, consisting of polyester fibres, is pad-dyed as described in Example 2 with a padding liquor having the following composition:

400 parts of an aqueous dispersion which contains 50% butadiene-acrylonitrile binder ("Perbunar N" Latex T, Registered Trade Mark of the firm Bayer)
566 parts of water
16.5 parts of C.I. Pigment Red 5, C.I. 12 490, of formula $$(C_2H_5)_2N-O_2S-\bigcirc-N=N-\underset{OCH_3}{\overset{HO}{\bigcirc}}-CO-NH-\bigcirc-\underset{Cl}{OCH_3}$$

15 parts of the coagulation agent of Example 1
2.5 parts of a sulphonated phenol-formaldehyde condensate (commercial product)
1000 parts The coagulation temperature of the thermo-sensitized binder dispersion is 43°. The pH value of the thermo-sensitized padding liquor is 6.5 and the pick-up is 100%, in relation to the dry weight of the fibres. The so obtained pad-dyed fibre sheet is dried in an air-circulating drier at a temperature of 150°. The fibre sheet has the properties described in Examples 1 and 2.

EXAMPLE 4

An impregnation liquor is prepared by mixing the following constituents in order, with stirring:

500 parts "Perburan" N Latex 3415 M (containing 47,5% butadiene acrylic binder),
340 parts water
~2 parts ammonia to adjust the pH to 8
30 parts coagulation agent (see below)
50 parts vulcanisation agent,
~6 parts ammonia to adjust the pH to 10,
2 parts sulphonated phenol-formaldehyde condensate,
70 parts filler When the impregnation is employed as described in any one of Examples 1 to 3, coagulation occurs at 40° C.

Coagulation Agent

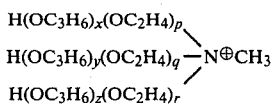

wherein $x+y+z=16$ and $p+q+r=10$ reacted with 1.4 mols toluene diisocyanate.

EXAMPLE 5

If, instead of the impregnation liquor employed in Examples 1 to 4, an impregnation of the following composition:

500 parts Chemigum Latex 4412 (containing 45% butadiene-acrylonitrile binder).
295 parts water
~2 parts ammonia to adjust the pH value to 8,
30 parts coagulation agent as employed in Example 5,
90 parts vulcanisation agent,
70 parts filler
~12 parts ammonia to adjust the pH to 10, and
1 part sulphonated phenol-formaldehyde condensate
is used, coagulation takes place at a temperature of 49° C.

EXAMPLE A 110 g (2.5 mols) ethyleneoxide are added to a mixture of 37.5 g (0.25 mol)triethanol amine and 0.75 g pulverized sodium hydroxide at 165°. After addition of a further 0.75 g pulverized sodium hydroxide, 239 g (4.7 mols) propyleneoxide are quickly added under light reflux at 155°-160° such that no strong reflux occurs and the temperature does not fall below 155°. After cooling to 70° over the period of 1 hour, 31.5 g (0.25 mol) dimethylsulphate are added dropwise and allowed to react for 6 hours. The pH is adjusted to a value of from 6 to 7 by the addition of 1.2 g concentrated sulphuric acid. Then 61 g (0.35 mol) toluene diisocyanate are added dropwise over a period of 1 hour and are reacted at 70° for 7 hours. The product obtained is diluted with 1435 g demineralised water over a period of 1 hour, and after 1 hour cooled to 30°. 1916 g of a clear brown-yellow liquid is obtained.

10 g of the product coagulate a dispersion containing 700 g/l "Perburan" Latex 3415 M at 39°.

EXAMPLE B 280 g (6.4 mols) ethyleneoxide are added to a mixture of 37.5 g (0.25 mol) triethanol amine and 0.75 g pulverized sodium hydroxide at 165°. After the addition of a further 0.75 g pulverized sodium hydroxide, 515 g (8.9 mols) propyleneoxide are added under light reflux at 155°-160° so quickly that no strong reflux occurs and the temperature does not fall below 155°. After cooling to 70°, the pH is adjusted to a value of 6 to 7 with 1.2 g sulphuric acid. 22 g (0.126 mol) toluene diisocyanate are added dropwise thereto over a period of 1 hour and reacted for 7 hours at 70°. 854 g of a clear yellow-brown liquid is obtained.

30 g of the product coagulate a dispersion containing 640 g/l "Perburan" N Latex 3415 M and 50 g/l vulcanisation agent at 56°. When the product is quarternized with 31.5 g (0.25 mol) dimethylsulphate the coagulation temperature is 51°.

What is claimed is:

1. In a process for producing a non-woven fabric wherein a non-woven fibrous web is impregnated with an aqueous binding agent dispersion suitable for use in the production of non-woven fabrics and containing a non-ionic and/or an anionic dispersing agent and a coagulation agent, the improvement which comprises employing as the coagulation agent a polyurethane having a weight average molecular weight from 500 to 20,000 which is the reaction product of (i) a polyoxyalkylated aliphatic amine containing d nitrogen atoms, where d is 1 to 5, and where d is greater than 1, each nitrogen atom is connected with the next by a $(C_{2-4})$alkylene moiety and from $d+1$ to $d+2$ polyoxy$(C_{2-4})$alkylene units, with the proviso that the molecule contains $C_2$ oxyalkylene units and $C_3$ and/or $C_4$ oxyalkylene units with the $C_3$ and/or $C_4$ units forming the majority of oxyalkylene units, and with the further proviso that when the number of polyoxyalkylene units is $d+1$, the other group bound to a nitrogen atom is a $(C_{1-6})$ alkyl group, and (ii) from 0.1 mols to 2 mols per mol of (i) but not exceeding the stoichiometric amount of a polyisocyanate, which reaction product is optionally in quaternized form and, is present in an amount of from 0.5 to 50 parts by weight per 100 parts of binder solids, followed by drying the web.

2. A process according to claim 1, in which each polyoxyalkylene unit solely contains a mixture of two and three carbon-containing oxyalkylenes with a preponderance of the latter.

3. A process according to claim 1, in which the amine is a mono- or diamine.

4. A process according to claim 3, in which the amine is a monoamine.

5. A process according to claim 2, in which the amine is a monoamine.

6. A process according to claim 1, in which the polyurethane is the reaction product of an amine of formula I

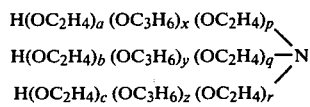

wherein the sum of $x+y+z$ is 9 to 45 and the sum of $a+b+c+p+q+r$ is 6 to 30 whereby $$\frac{a+b+c+p+q+r}{y+x+z}$$

is 0.6 to 0.9 and each of x, y and z is a whole number $\geq 1$ and each of a, b, c, p, q and r is a whole number $\geq 0$, and 0.2 to 1.5 mols per mol of amine of an aliphatic, cycloaliphatic or aromatic diisocyanate, which product is optionally in quaternized form.

7. A process according to claim 6, in which the sum of $x+y+z$ is 12 to 36.

8. A process according to claim 6, in which the sum of $a+b+c+p+q+r$ is 10 to 28.

9. A process according to claim 8, in which the sum of $p+q+r$ is greater than the sum of $a+b+c$.

10. A process according to claim 9, in which the sum of a+b+c is 0 to 3.

11. A process according to claim 6, in which the sum of x+y+z is 14 to 20.

12. A process according to claim 6, in which the diisocyanate is toluene diisocyanate, hexylenediisocyanate or cyclohexylenediisocyanate.

13. A process according to claim 6, in which the diisocyanate is employed in an amount of from 0.5 to 1.5 mols.

14. In an aqueous binder dispersion containing a binding agent suitable for use in the production of nonwoven fabrics, a non-ionic and/or an anionic dispersing agent and a coagulation agent, the improvement wherein the coagulation agent is present in an amount of from 0.5 to 50 parts per 100 parts of binder solids and is a polyurethane having a weight average molecular weight of from 500 to 20,000 which is the reaction product of
   (i) a polyoxyalkylated aliphatic amine containing d nitrogen atoms, where d is 1 to 5, and where d is greater than 1, each nitrogen atom is connected with the next by a ($C_{2-4}$)alkylene moiety and from d+1 to d+2 polyoxy($C_{2-4}$)alkylene units, with the proviso that the molecule contains $C_2$ oxyalkylene units and $C_3$ and/or $C_4$ oxyalkylene units with the $C_3$ and/or $C_4$ units forming the majority of oxyalkylene units, and with the further proviso that when the number of polyoxyalkylene units is d+1, the other group bound to a nitrogen atom is a ($C_{1-6}$) alkyl group and
   (ii) from 0.1 mols to 2 mols per mol of (i) but not exceeding the stoichiometric amount of a polyisocyanate,
which reaction product is optionally in quaternized form.

15. An aqueous binder dispersion according to claim 14 in which the polyurethane is the reaction product of an amine of formula I

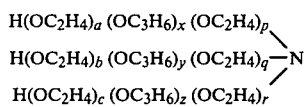

wherein the sum of x+y+z is 9 to 45 and the sum of a+b+c+p+q+r is 6 to 30
whereby $$\frac{a+b+c+p+q+r}{y+x+z}$$

is 0.6 to 0.9 and each of x, y and z is a whole number $\geq 1$ and each of a, b, c, p, q and r is a whole number $\geq 0$, and 0.2 to 1.5 mols of an aliphatic, cycloaliphatic or aromatic diisocyanate.

16. An aqueous binding dispersion according to claim 14, in which the amount of polyurethane is from 1 to 50 parts per 100 parts of binder solids.

17. A coagulation agent which is the reaction product of
   (i) an amine of formula I

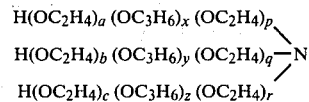

wherein the sum of x+y+z is 9 to 45 and the sum of a+b+c+p+q+r is 6 to 30
whereby $$\frac{a+b+c+p+q+r}{y+x+z}$$

is 0.6 to 0.9 and each of x, y and z is a whole number $\geq 1$ and each of a, b, c, p, q and r is a whole number $\geq 0$, and 0.2 to 1.5 mols of an aliphatic, cycloaliphatic or aromatic diisocyanate.

18. A coagulation agent according to claim 17, in which the sum of x+y+z is 12 to 36, and in which the sum of a+b+c+p+q+r is 10 to 28.

19. A coagulation agent according to claim 18, in which the sum of a+b+c is from 0 to 3.

20. A coagulation agent according to claim 18, in which the sum of x+y+z is 14 to 20.

21. A coagulation agent according to claim 20, in which the sum of x+y+z is 16, the sum of p+q+r is 10 and each of a, b and c is 0.

22. A coagulation agent according to claim 17, in which the amine is reacted with toluene diisocyanate.

23. A process according to claim 1 wherein the polyurethane reaction product is present in the dispersion in an amount effective to form a coagulate with the binder at a temperature below the wet bulb temperature of the impregnated web during the drying step.

24. A process according to claim 1 wherein the polyisocyanate is a di- or triisocyanate.

25. A process according to claim 23 wherein the binding agent is natural latex or a homo- or copolymer of butadiene, styrene, acrylonitrile, isobutylene, vinyl acetate, vinyl propionate, a vinyl halide, vinylidene chloride, methyl acrylate, butyl acrylate, a methylacrylic acid ester, methylene-bis-acrylic amide or N-methyl-1-acrylamide.

26. A process according to claim 6 wherein the polyurethane reaction product is present in the dispersion in an amount effective to form a coagulate with the binder at a temperature below the wet bulb temperature of the impregnated web during the drying step.

27. A process according to claim 26 wherein the diisocyanate contains up to 9 carbon atoms.

28. A process according to claim 23 wherein the coagulate is formed at a temperature above room temperature but not above 60° C.

29. A process according to claim 26 wherein the coagulate is formed at a temperature above room temperature but not above 60° C.

30. A process according to claim 23 wherein drying is effected in an atmosphere having a temperature of 120° to 160° C.

31. A process according to claim 26 wherein drying is effected in an atmosphere having a temperature of 120° to 160° C.

32. A composition according to claim 14 in which the amount of polyurethane reaction product is an amount effective to form a coagulate with the binder at a temperature above room temperature but not above 60° C.

33. A composition according to claim 15 in which the amount of polyurethane reaction product is an amount effective to form a coagulate with the binder at a temperature above room temperature but not above 60° C.

34. A composition according to claim 33 wherein the diisocyanate contains up to 9 carbon atoms.

35. A composition according to claim 34 wherein the diisocyanate is toluene diisocyanate, hexylene diisocyanate or cyclohexylene diisocyanate.

36. A process according to claim 4 wherein the binding agent is natural latex or a homo- or copolymer of butadiene, styrene, acrylonitrile, isobutylene, vinyl acetate, vinyl propionate, a vinyl halide, vinylidene chloride, methyl acrylate, butyl acrylate, a methylacrylic acid ester, methylene-bis-acrylic amide or N-methyl-1-acrylamide.

37. A process according to claim 27 wherein the binding agent is natural latex or a homo- or copolymer of butadiene, styrene, acrylonitrile, isobutylene, vinyl acetate, vinyl propionate, a vinyl halide, vinylidene chloride, methyl acrylate, butyl acrylate, a methylacrylic acid ester, methylene-bis-acrylic amide or N-methyl-1-acrylamide.

38. An aqueous binder dispersion according to claim 15 wherein the binding agent is natural latex or a homo- or copolymer of butadiene, styrene, acrylonitrile, isobutylene, vinyl acetate, vinyl propionate, a vinyl halide, vinylidene chloride, methyl acrylate, butyl acrylate, a methylacrylic acid ester, methylene-bis-acrylic amide or N-methyl-1-acrylamide.

39. An aqueous binder dispersion according to claim 35 wherein the binding agent is natural latex or a homo- or copolymer of butadiene, styrene, acrylonitrile, isobutylene, vinyl acetate, vinyl propionate, a vinyl halide, vinylidene chloride, methyl acrylate, butyl acrylate, a methylacrylic acid ester, methylene-bis-acrylic amide or N-methyl-1-acrylamide.

40. A process according to claim 10 wherein the sum of $x+y+z$ is 14 to 20 and the diisocyanate is toluene diisocyanate, hexylenediisocyanate or cyclohexylenediisocyanate.

41. A composition according to claim 35 wherein, in the amine of formula I, the sum of $a+b+c+p+q+r$ is 10 to 28, the sum of $a+b+c$ is 0 to 3 and the sum of $x''y+z$ is 14 to 20.

42. A composition according to claim 19 wherein the diisocyanate is toluene diisocyanate.

43. A coagulation agent according to claim 21 in which the amine is reacted with toluene diisocyanate.

* * * * *